Aug. 25, 1925.
T. M. FOSS
1,551,381
EMERGENCY RIVET
Filed Jan. 12, 1925
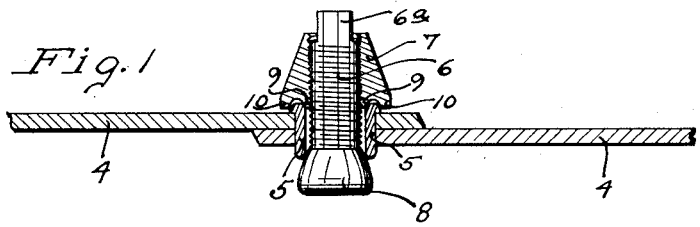
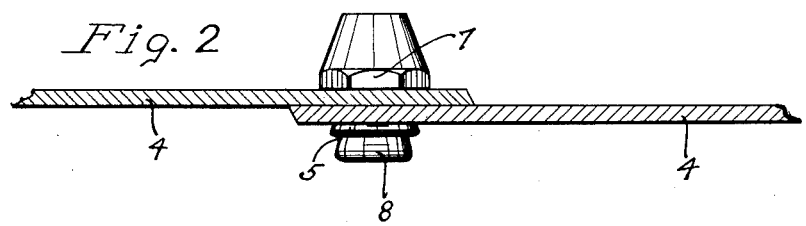
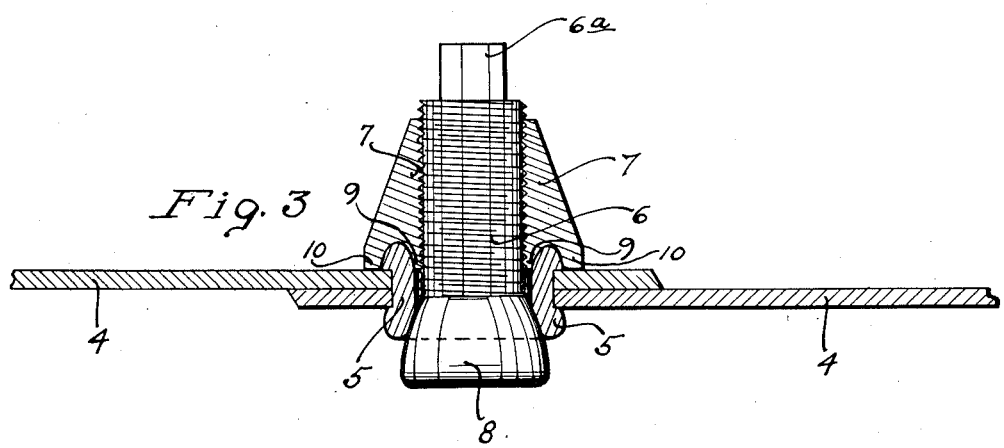
Inventor
Thomas Martin Foss
By his Attorneys
Merchant and Lemore Patented Aug. 25, 1925.

1,551,381

UNITED STATES PATENT OFFICE.

THOMAS MARTIN FOSS, OF MINNEAPOLIS, MINNESOTA, ASSIGNOR, BY DIRECT AND MESNE ASSIGNMENTS, TO AMERICAN EXPANSION RIVET CORP., INC., OF MINNEAPOLIS, MINNESOTA, A CORPORATION OF MINNESOTA.

EMERGENCY RIVET.

Application filed January 12, 1925. Serial No. 1,793.

*To all whom it may concern:*

Be it known that I, THOMAS MARTIN FOSS, a citizen of the United States, residing at Minneapolis, in the county of Hennepin and State of Minnesota, have invented certain new and useful Improvements in Emergency Rivets; and I do hereby declare the following to be a full, clear, and exact description of the invention, such as will enable others skilled in the art to which it appertains to make and use the same.

My present invention provides a simple and highly efficient emergency rivet especially adapted for use in places where hot rivets cannot be applied and where the application of ordinary rivets is impossible or difficult. A good illustration of the necessity for such emergency rivets is found in large oil or gasoline tanks. These tanks are frequently as much as thirty feet in depth and hold large quantities of oil or gasoline, and sometimes the joints of such tanks will leak at or near the bottoms of the tanks, or, at any rate, below the oil level. To stop such leaks by the application of rivets, it has hitherto been necessary, first, that the tanks be drained and then that a workman enter the tank to apply or to assist in applying the rivet or rivets from the interior of the tank. Because of gases generated in such empty tanks, it is necessary for the workman entering the tank to wear a gas mask and to be supplied with oxygen from a pump operated by a person assigned to that task. Moreover, the use of a hammer or sledge in riveting is very dangerous because it is liable to produce a spark which may ignite the gas and produce an explosion. At best, the stopping of the leaks in these tanks by the application of rivets in the old way is very expensive, because of the number of persons employed and the time consumed.

My invention provides an extremely simple and highly efficient emergency rivet that may be applied in the place of an old rivet or in a newly drilled hole, to a tank filled with oil or other liquid and which, by a simple operation, may be mechanically expanded and caused to form a liquid and gastight joint. This improved rivet is illustrated in the accompanying drawings, wherein like characters indicate like parts throughout the several views.

Referring to the drawings:

Fig. 1 is an axial section showing the rivet applied but not as yet tightened up;

Fig. 2 shows the rivet in elevation, but the tank sheets to which it is applied in section; and Fig. 3 is a view corresponding to Fig. 1, but on a larger scale and the rivet tightened.

The tank sheets are indicated by the numeral 4. The rivet body 5 is of tubular form and preferably of quite soft steel capable of being upset and expanded at its ends without cracking. I have found, in actual practice, that I can obtain by far the best results by simply rounding the inner edge of the rivet both internally and externally, so that that edge is approximately semi-circular in radial planes of the rivet. The outer end of the rivet is slightly enlarged or flanged to prevent the same from being inserted completely through or too far through the rivet hole; and this enlarged or flanged end, to get the best results, should also be rounded externally and internally.

The core or central portion of the rivet is in the form of an expansion bolt 6, on the threaded outwardly extended end of which works a nut 7. At its inner or insertable end, the bolt 6 is provided with a flaring head 8 shown as slightly spherical but capable of taking various forms as long as it is given a decided flare. This head 8, however, must not have an external diameter greater than that of the external diameter of the tubular rivet 5, for otherwise it could not be inserted through the rivet hole. This flaring head engages the rounded end of the rivet and, as hereinafter noted, will expand the same when the nut 7 is tightened.

The nut 7 is a hexagonal nut, but it might take any other suitable form, and preferably it is beveled so that, in the finished rivet, (see Fig. 2), it will have much the appearance of an ordinary rivet head. In its operative face, that is, in the face that engages the outer end of the tubular rivet body, the nut 7 is formed with an annular groove cut close enough to the threaded bore thereof to leave an annular wedge-acting expanding flange 9 and an outer annular contracting flange 10. The said groove in the nut somewhat closely fits the rounded outer end flange of the rivet body 5, so that the initial pressure between the nut and rivet body will come on the flanges 9 and 10, and the former will expand the outer end of the rivet body slightly, while the flange 10 will limit such expansion. The combined effect, however, is to finally cause the groove and nut to very closely engage the outer end of the rivet at the time the inner face of the nut has been drawn into tight and close engagement with the outer face of the adjacent sheet 4.

When the nut is tightened, the flaring head 8 will expand the inner end of the rivet, thereby changing the form of the inner end of the rivet body from that shown in Fig. 1, in which it is of cylindrical form, into that shown in Fig. 3, in which the inner end of the rivet has been upset and expanded and forced into fluid-tight engagement with the tank sheets, so that the rivet cannot possibly be forced out of position by internal pressure from within the tank.

To hold the bolt 6 against rotation while the nut 7 is being given its initial tightening action and the head 8 is being drawn into tight engagement with the rivet body, the outer end of the bolt 6 is shown as flattened at 6* for the application thereto of a wrench or similar tool. After the rivet has been tightened, as shown in Fig. 3, the flattened end 6* of the bolt 6 may be sawed off or filed away, thus giving the outer end portion of the rivet the neat and finished appearance shown in Fig. 2.

The rivet illustrated in the drawings of this application is the latest and most efficient form of rivet that I have so far devised. In my prior application Serial No. 735,178, filed August 30, 1924, I have shown an emergency rivet in some respects quite similar to the present rivet, but I have found in practice that, by providing the nut member of the rivet not only with an annular rivet-body-expanding flange or shank such as shown at 9, but also with the annular groove and surrounding flange 10 arranged to contact with the flue sheet and to limit the expansion of the outer end of the rivet body, a more efficient as well as a more finished and better-looking rivet head may be produced.

When an old rivet has been removed, the emergency rivet may be quickly applied as follows: The tubular rivet body, the expanding bolt, and the nut being assembled but with the nut still loose, the tubular body and the head of the expanding bolt may be quickly inserted through the rivet hole, forcing the rivet body to the place where its flanged outer end is brought tightly against the outer surface of the outer tank sheet. Then the nut should be tightened on the bolt. Should there be any tendency of the bolt to rotate under initial tightening of the nut, the bolt may be positively held against such rotation by the application of a wrench or other tool to the flattened end 6* of the bolt. When the head 8 of the bolt has been drawn tightly against the inner end of the tubular rivet body and the latter has been slightly expanded into frictional contact with the rivet hole, there will, of course, be no further tendency for the rivet body to rotate, and then the wrench may be removed from the flattened end of the bolt and the nut may be screwed tight until it is drawn into complete and the closest kind of contact with the tank sheet. Of course, the operation already noted of cutting off the flattened end of the bolt to finish the rivet head should be the last operation performed.

The finished rivet head, while neat in appearance, nevertheless, has, in the preferred arrangement illustrated, sufficient exposed angular surface to permit the same to be unscrewed by the use of a wrench, if, at any time, such operation should be found desirable. If found desirable, a hexagonal nut of quite common external form may be used and it may be then beveled by the use of a reamer after the nut has been tightened and the rivet expanded and, if desired, by the use of this reamer, all of the external angular surface of the rivet may be removed, thereby giving the rivet head more closely the approximation of an ordinary rivet head in appearance.

What I claim is:

1. A rivet comprising a tubular rivet body, a bolt having a flanged head engageable with the inner end of the rivet body to expand the same, and a nut working on the outer end of said bolt, said nut having in its inner face an annular groove engaging the outer end of the rivet body and forming inner and outer annular flanges, the former serving to expand the outer end of the rivet body and the latter to limit the expansion of said outer end of the rivet body.

2. A rivet comprising a tubular rivet body, a bolt having a flanged head engageable with the inner end of the rivet body to expand the same, and a nut working on the outer end of said bolt, said nut having in its inner face an annular groove engaging the outer end of the rivet body and forming inner and outer annular flanges, the former serving to expand the outer end of the rivet body and the latter to tightly engage the adjacent sheet when said nut is tightened and said tubular rivet body is expanded.

3. A rivet comprising a tubular rivet body, a bolt having a flanged head engageable with the inner end of the rivet body to expand the same, and a nut working on the outer end of said bolt, said nut having in its inner face an annular groove engaging the outer end of the rivet body and forming inner and outer annular flanges, the former serving to expand the outer end of the rivet body and the latter to limit the expansion of said outer end of the rivet body and to tightly engage the adjacent sheet when said nut is tightened and said tubular rivet body is expanded.

4. The structure defined in claim 1 in which the outer end of the tubular rivet body is slightly enlarged to afford a stop shoulder limiting the inward movement of the rivet.

5. The structure defined in claim 3 in which the outer end of the tubular rivet body is slightly enlarged to afford a stop shoulder limiting the inward movement of the rivet.

6. The structure defined in claim 1 in which the outer end of the tubular rivet body is slightly enlarged to afford a stop shoulder limiting the inward movement of the rivet, and in which the inner and outer ends of the tubular rivet body are rounded in the radial sections of the rivet body.

7. The structure defined in claim 3 in which the outer end of the tubular rivet body is slightly enlarged to afford a stop shoulder limiting the inward movement of the rivet, and in which the inner and outer ends of the tubular rivet body are rounded in the radial sections of the rivet body.

In testimony whereof I affix my signature.

THOMAS MARTIN FOSS.